United States Patent [19]
Ghosh et al.

[11] 3,866,118
[45] Feb. 11, 1975

[54] MICROWAVE SPECTROMETER

[75] Inventors: Asoke Kumar Ghosh, D.D.O.; Harry John Moody, Pierrefords, both of Quebec, Canada

[73] Assignee: RCA Corporation, New York, N.Y.

[22] Filed: Nov. 8, 1973

[21] Appl. No.: 413,809

[52] U.S. Cl......... 324/58.5 A, 23/254 E, 23/255 E, 324/77 G
[51] Int. Cl............................................. G01r 27/04
[58] Field of Search........... 324/58.5 A, 58 A, 77 G; 23/254 E, 255 E

[56] References Cited
UNITED STATES PATENTS

| | | | |
|---|---|---|---|
| 2,532,817 | 12/1950 | Lafferty, et al. | 324/58.5 A |
| 3,119,062 | 1/1964 | Codd | 324/58 A X |
| 3,399,345 | 8/1968 | Cohn | 324/58 A X |
| 3,439,266 | 4/1969 | Rogers | 324/58 A |
| 3,522,527 | 8/1970 | Williams, et al. | 324/58.5 A |
| 3,711,769 | 1/1973 | Peake | 324/58 A X |
| 3,783,373 | 1/1974 | Jawor | 324/58.5 A |

*Primary Examiner*—Stanley T. Krawczewicz
*Attorney, Agent, or Firm*—Edward J. Norton; William Squire

[57] ABSTRACT

A microwave spectrometer includes means for sweeping an unknown sample and a standard sample with a microwave signal in a given bandwidth. The absorption spectrum of all the components, i.e., gases in the atmosphere, in the unknown sample which interact with the microwave signal and the absorption spectrum of the standard sample component, i.e., a pollutant gas which also interacts with the microwave signal are derived therefrom, the standard sample component comprising that component being analyzed in the unknown sample. The two derived absorption spectrum signals are cross-correlated for deriving a signal manifesting the amount of the component being analyzed, i.e., the pollutant, in the unknown sample.

12 Claims, 2 Drawing Figures

MICROWAVE SPECTROMETER

BACKGROUND OF THE INVENTION

In microwave spectroscopy, the molecular composition of a gas is studied by determining the microwave frequencies in which absorption peaks occur. The basic apparatus which has been used for such study consists of a variable frequency microwave generator, a microwave crystal detector and a waveguide coupling the two together with the waveguide containing the gas to be analyzed. The absorption peak is then determined by scanning the frequency of the microwave generator across the range of interest and measuring the variations in microwave power at the detector. In this system extreme sensitivity of measurement is required. This sensitivity of measurement is compounded when the apparatus is used to analyze one gas contained within another gas.

In these systems, the measurement under discussion is that of a comparison of the microwave power received when absorption peak is present to that of the power received without any absorption peak. However, any variation in the ambient power level constitutes a noise background for the measurement. As a result, the prior art apparatus has approached the problem of microwave spectroscopy by attempting to reduce the noise for microwave spectroscopy measurements. In effect, noise reductions are attempts at increasing the sensitivity of the measuring instruments.

In these prior art microwave techniques only one frequency in a given spectrum of frequencies associated with a given sample component then being analyzed is detected at a given time. However, it is known that each pollutant may be defined by a microwave absorption spectrum of frequencies. Different pollutants or components are defined by different spectrums. It is therefore plain that a system which detects one frequency of a component is incomplete for identifying the corresponding spectrum of that component. Further, errors may be introduced in associating the one frequency with the corresponding spectrum since there is the possibility that there is one absorption frequency in the spectrum which is common to a number of components. As a result, discovery of a particular frequency of microwave energy which interacts with a component at best provides an ambiguous determination of the identification of that component in an environment including a plurality of components.

These techniques therefore require the search and analysis of a sample under examination at a number of separate, discrete frequencies and the production by trial and error as best as can be determined the spectrum for a given element in that sample. As a result, this procedure is complex and troublesome to implement. For a further discussion of the problems in the diagnosis of air pollution by microwave spectroscopy see the following article: "Diagnosis of Air Pollution by Microwave Spectroscopy" by William Graff and I. H. Suffet, International Journal of Environmental and Analytical Chemistry, Vol. 1, pages 327–342, Gordon and Breach, Great Britain, 1972.

SUMMARY OF THE INVENTION

In accordance with the present invention, an apparatus is provided which includes means for deriving a first signal comprising solely a spectrum of frequencies of electromagnetic radiation within a certain bandwidth, which spectrum interacts with a sample of matter. The sample includes a plurality of components including an unknown amount of a given component. Means are included for providing a second signal comprising solely the spectrum of frequencies of electromagnetic radiation within the certain bandwidth which spectrum interacts with a known amount of the given component. Correlating means are provided which are responsive to the first and second signals applied thereto for cross-correlating the first and second signals, producing as an output signal therefrom a signal manifesting the amount of the given component in the sample matter.

IN THE DRAWINGS

FIG. 1 illustrates a block diagrammatic illustration of an apparatus constructed in accordance with an embodiment of the present invention, and FIG. 2 illustrates a second embodiment of the correlator of FIG. 1.

DETAILED DESCRIPTION

Figure 1:
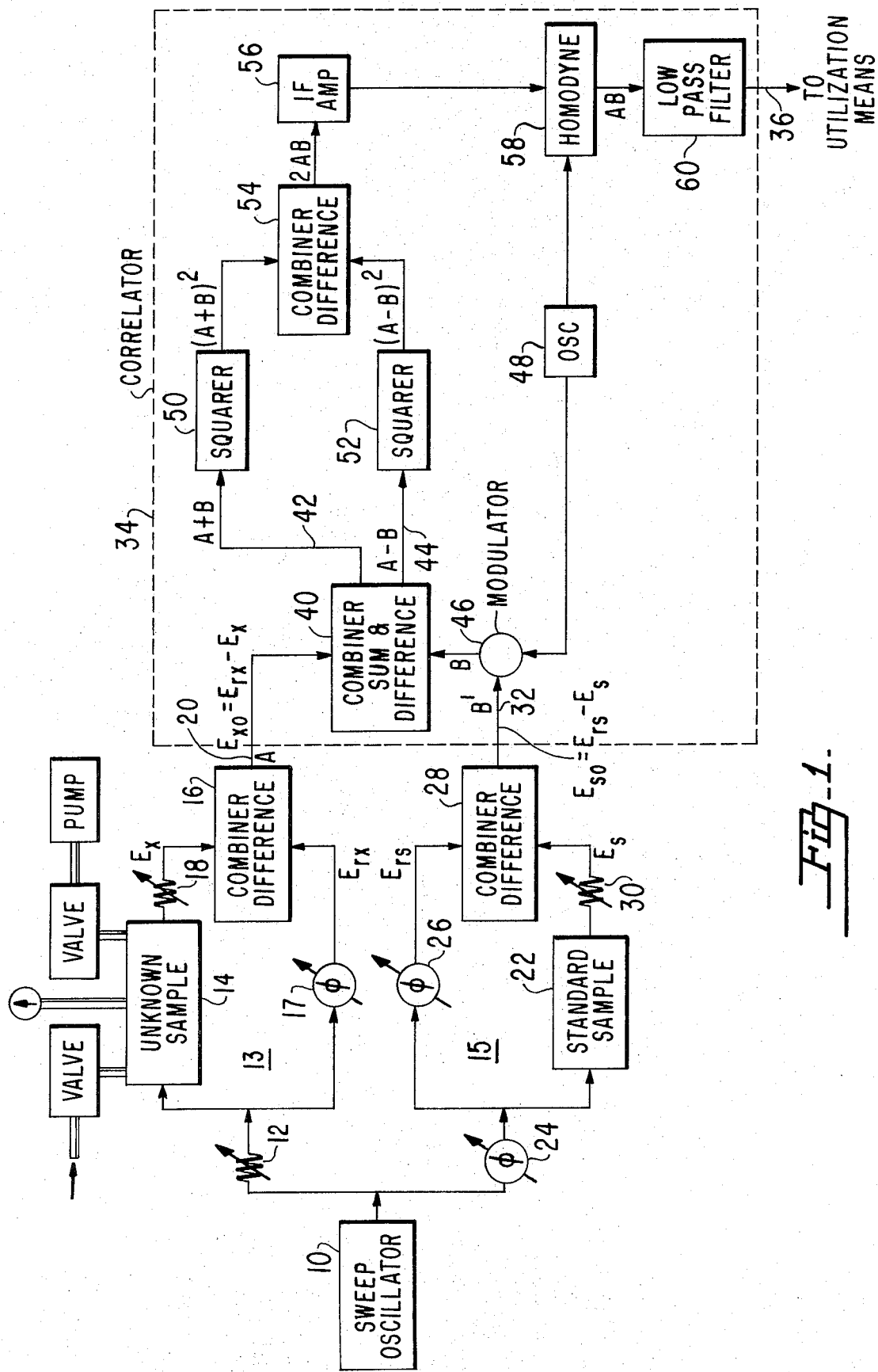

In FIG. 1, sweep oscillator 10 provides a suitable microwave signal which sweeps across a predetermined microwave bandwidth. Preferably, this bandwidth is wide enough to emcompass all the major absorption lines of the given component. The oscillator 10 may be a conventional well known microwave generator.

The output of oscillator 10 is applied to two parallel branches 13 and 15. Branches 13 and 15 serve to provide at the respective outputs thereof microwave signals comprising solely the spectrum of frequencies at which absorption of the microwave energy occurs in the unknown and known samples. As to the known sample, the absorption spectrum is the characteristic spectrum for that sample. As to the unknown sample, the absorption spectrum may include the characteristic spectrum for each gas component contained therein.

The signals manifesting the absorption spectrum of the known and unknown samples are derived and correlated by cross-correlation techinques to be described below. As a result, the signal representing the absorption spectrum of interest is multiplied and integrated and at the same time isolated from the spectrum of the remaining components in the unknown sample as manifested by the microwave output signal of the unknown sample cell. The resultant cross-correlation signal is reduced to a DC level which can be readily calibrated to manifest the amount of unknown component in the sample being analyzed. Sensitivity and noise problems of prior art techniques are overcome while providing improved sensitivity with reduced complexity.

In branch 13, the output of sweep oscillator 10 is applied by suitable waveguide means (not shown) through a variable resistance 12 to unknown sample cell 14. Cell 14 is a conventional unit which holds a sample of gas such as the atmosphere or the like to be analyzed. The output of cell 14 is applied to a combining device 16 through a variable resistance 18 by way of suitable waveguide apparatus (not shown). The output of oscillator 10 is also applied to device 16 through variable phase shifter 17 coupled across cell 14 and resistance 18.

Device 16 may be a conventional so-called waveguide magic T device which has two inputs and two outputs. At one output a signal is provided which is the sum of the two input signals applied thereto, while at the other output a signal is provided which is the difference of the two input signals applied thereto. The device 16 output signal $E_{xo}$ (signal A) appearing on line 20 is the difference output, representing the difference between the device 16 input signals $E_{rx}$ and $E_x$. The signal $E_x$ is the signal produced by cell 14 and resistance 18. The signal $E_{rx}$ is the output signal of phase shifter 17.

In branch 15, the output of sweep oscillator 10 is applied to a standard sample cell 22 by way of suitable waveguide apparatus (not shown) through a variable phase shifter 24. The output of phase shifter 24 is also applied to variable phase shifter 26. The output signal $E_{rs}$ of phase shifter 26 is applied as an input to a so-called waveguide magic T device 28 as one input and the output of cell 22 is applied through variable resistance 30 as a second input signal $E_s$ to device 28. The output of device 28 along line 32 is signal B' also designated $E_{so}$. Signal $E_{so}$ represents the difference between the two input signals $E_{rs}$ and $E_s$ applied as separate inputs to magic T device 28. The signal $E_{xo}$ (A) on lead 20 and signal $E_{so}$ (B') on lead 32 are applied to cross-correlation correlator 34. Correlator 34 by cross-correlation provides at the output lead 36 thereof a signal which represents the analyzed amount of the predetermined gas component present in the sample in unknown cell 14.

Correlator 34 includes modular 46 and combiner 40. Modulator 46 modulates signal B' at a suitable frequency provided by oscillator 48. Preferably this frequency is 30 mHz. The modulated output signal B of modulator 46 is applied as one of two inputs to combiner 40. The other signal applied as an input to combiner 40 is signal A. The combiner 40 output signal on lead 42 is (A+B), while the signal on lead 44 is (A−B). It should thus be appreciated that combiner 40 may be a conventional so-called magic T device which takes the sum and difference between the two input signals A and B.

Output lead 42 is coupled as an input to squarer 50 while output lead 44 is coupled as an input to squarer 52. Squarers 50 and 52 may be of the diode detector type. The outputs of squarers 50 and 52 are applied as inputs to combiner 54. Combiner 54 is another so-called magic T which takes the difference between the two inputs. The output of combiner 54 is a signal containing a DC component and a component that is twice the frequency of oscillator 10. Both of these components are modulated at the modulating frequency 30 mHz because of the modulation of signal B. The modulation is detected and applied to IF amplifier 56, the output of which, in turn, is applied as an input to homodyne circuit 58. Circuit 58 receives as an input a signal from oscillator 48. Homodyne circuit 58 produces in a well known manner at the output thereof a DC signal representing the amount of unknown component in cell 14. The DC signal is then applied to low pass filter 60 whose output 36 is applied to suitable utilization means for indicating the amount of unknown component in the unknown sample.

In operation a microwave signal is swept through the given bandwidth by oscillator 10 and applied to the variable resistance 12 and phase shifter 24. The sweep signal applied to cell 14, phase shifter 17, cell 22 and phase shifter 26 are each one-fourth the power of the signal from oscillator 10 and are of substantially identical phase and amplitude.

The variable resistance 12 is provided to equalize the amplitude of the sweep signal applied to branches 13 and 15. The amplitude of the signal applied to branches 13 and 15 should be the same within a given amount which amount results in a signal on lead 36 that is smaller than the output signal corresponding to the smallest amount of the component in the gas sample to be measured. To do this is within the skill of those skilled in this art.

Phase shifter 24 serves to set the phase of the microwave signal applied to branches 13 and 15 in substantially identical phase. That is, phase shifter 24 is preadjusted so that the signal B' on branch 15 output lead 32 is substantially identical to the phase of signal A on branch 13 output lead 20. It will be appreciated by those skilled in this art that the phase in the two branches may be off slightly with respect to each other. The phase of the signals applied to branches 13 and 15 should be the same within a given amount which amount results in a signal on correlator output lead 36 that is smaller in amplitude than the output signal on lead 36 corresponding to the smallest amount of the component in the gas sample to be measured. To do this is also within the skill of those skilled in this art. As a result, the sweep signals applied to the respective legs of branches 13 and 15 are substantially the same in phase and amplitude. In addition, the phase and amplitude of the signal processed in each leg of branch 13 need also be substantially the same. This criteria also applies to the phase and amplitude of the signals in each leg of branch 15.

In branch 15 phase shifter 26 adjusts the phase of output signal $E_{rs}$ substantially identical in phase with output signal $E_s$ produced by serially connected standard sample cell 22 and variable resistance 30. Variable resistance 30 serves to adjust the amplitude of signal $E_s$ substantially identical to the amplitude of signal $E_{rs}$.

In branch 13, in a similar manner, variable resistance 18 and phase shifter 17 are preadjusted to set the respective amplitude and phase of the respective output signals $E_x$ and $E_{rx}$ on the legs of branch 13 substantially identical to each other. The phase shifter 17 output signal $E_{rx}$ in branch 13 is combined with the variable resistance 18 output signal $E_x$ by combiner device 16. In device 16, signal $E_x$ is subtracted from signal $E_{rx}$ as noted above.

The physical length of each side of branch 13 including cell 14, resistance 18 on one side and variable phase shifter 17 on the other side are substantially the same. The leg of branch 13 including phase shifter 17 is made substantially the same electronic length as the other leg by phase shifter 17. In the same manner, the lengths of each leg of branch 15 are made substantially the same.

It will thus be evident that signal $E_x$ in branch 13 and signal $E_s$ in branch 15 comprise the respective signals provided by sweep oscillator 10 altered by the absorption spectrum of the components in respective cells 14 and 22. As is well known, the absorption of microwave energy by a sample reduces the power level thereof at each of the frequencies in the absorption spectrum. However, in accordance with the present invention, the absorption spectrum is provided in terms of increased power level by subtracting signal $E_x$ from signal $E_{rx}$ and signal $E_s$ from signal $E_{rs}$. Further, the sensitivity of the spectrometer of the present invention is also enhanced by this subtracting process wherein there is thus provided signals $E_{xo}$ and $E_{so}$ which include the absorption spectrum of the unknown sample. For each frequency at which absorption occurs in cells 14 and 22, the difference between the signal levels of signals $E_{rx}$ and $E_x$, and signals $E_{rs}$ and $E_s$, respectively, provide positive excursions. These positive excursions define the spectrum of the unknown components in cell 14 and the known component in cell 22.

A standard sample of gas stored in cell 22 is a sample of a known amount of one component of the gas to be examined in the unknown sample cell 14. Thus, while the cell 14 may include a number of components each having a correponding different absorption spectrum, the sample contained in cell 22 is a single component having a single characteristic absorption spectrum. It will thus be appreciated that the signal $E_{so}$ is a signal having a characteristic spectrum for a single component of the gas contained within the standard sample cell 22. This characteristic spectrum may or may not be present in the spectrum of the unknown sample signal $E_{xo}$. It should be appreciated that the signals $E_{xo}$ and $E_{so}$ are approximately zero in value except at those frequencies at which absorption occurs.

It can be shown mathematically that a cross-correlation term is produced by cross-correlation of signals $E_{so}$ and $E_{xo}$. This term is represented by a signal having a parameter which is proportional to the product of the amount of the known component or gas in cell 22 and the unknown amount of the same gas or element in sample cell 14.

With no gas in cells 14 or 22, signals $E_x$, $E_s$, $E_{rx}$ and $E_{rs}$ are adjusted to be substantially the same in amplitude and phase in the manner described above. It can be shown in this case that the following relationships are present:

$$E_x = E_{RX} e^{-\alpha_x L} \approx E_{RX}(1-\alpha_x L) \quad (1)$$

$$E_S = E_{RS} e^{-\alpha_s L} \approx E_{RS}(1-\alpha_s L) \quad (2)$$

where $\alpha_s$ and $\alpha_x$ contain both the absorption coefficient of the gas and the concentration of the gas in the cell, and $e^{-\alpha L}$ has been approximated by $1-\alpha L$, and $L$ is the length of the line in each side of the branches 13 and 15 in centimeters.

Combining at devices 16 and 28:

$$E_{xo} = (E_{RX} - E_x)/\sqrt{2} = E_{RX}\alpha_x L / \sqrt{2} \quad (3)$$

$$E_{so} = (E_{RS} - E_s)/\sqrt{2} = E_{RS}\alpha_s L / \sqrt{2} \quad (4)$$

Combining at device 40:

$$E_\Delta = \tfrac{1}{2}(E_{RX}\alpha_x L - E_{RS}\alpha_s L) \cos \omega t \quad (5)$$

$$E_\Sigma = \tfrac{1}{2}(E_{RX}\alpha_x L + E_{RS}\alpha_s L) \cos \omega t \quad (6)$$

where the time variation at the microwave frequency has been included. Squaring and substituting $(1+\cos 2\omega t)/2 = \cos^2 \omega t$ $$E_\Delta^2 = \tfrac{1}{8}(1+\cos 2\omega t)(E_{RX}^2 \alpha_x^2 L^2 + E_{RS}^2 \alpha_s^2 L^2 - 2E_{RS}E_{RX}\alpha_s \alpha_x L^2) \quad (7)$$

$$E_\Sigma^2 = \tfrac{1}{8}(1+\cos 2\omega t)(E_{RX}^2 \alpha_x^2 L^2 + E_{RS}^2 \alpha_s^2 L^2 + 2E_{RS}E_{RX}\alpha_s \alpha_x L^2) \quad (8)$$

subtracting, $$E_\Sigma^2 - E_\Delta^2 = \tfrac{1}{2}(1+\cos 2\omega t)(E_{RS}E_{RX}\alpha_x \alpha_s L^2) + \text{neglected} \quad (9)$$

terms.

As seen in equation 9, the cross-correlation term shown is isolated from other terms (neglected) containing only absorption in the standard cell or only absorption in the unknown cell. The cross-correlation term appears as a DC term and also as an AC term at twice the carrier frequency, that is, twice the frequency of the resonance, or, if a heterodyne receiver is used, at twice the IF frequency.

As set forth in equation 9 the signal on lead 36 comprises solely the correlation term manifesting the signal whose amplitude is proportional to the amount of the unknown gas in sample cell 14. The amplitude of the DC signal at output 36 can be calibrated in a conventional manner to provide a suitable indication of the amount of unknown gas in cell 14.

Since the signal on output lead 32 of branch 15 having a given phase and bandwidth represents a known sample, such a signal can be provided by a suitable pre-recorded apparatus such as a tape recording or other storage means.

The sample of gas to be analyzed placed in cell 14 is at reduced pressure. In providing the gas to be analyzed, cell 14 is evacuated and the sample of the atmosphere being tested placed in the cell 14. This is accomplished by conventional well known pumps and valves.

In the embodiment of FIG. 1, two squarers 50 and 52 are utilized. These squarers need to be precisely matched. The extent to which these devices need be matched can be determined in a conventional manner. However, to avoid the matching problem presented in the embodiment described above, an alternate arrangement can be provided.

Figure 2:
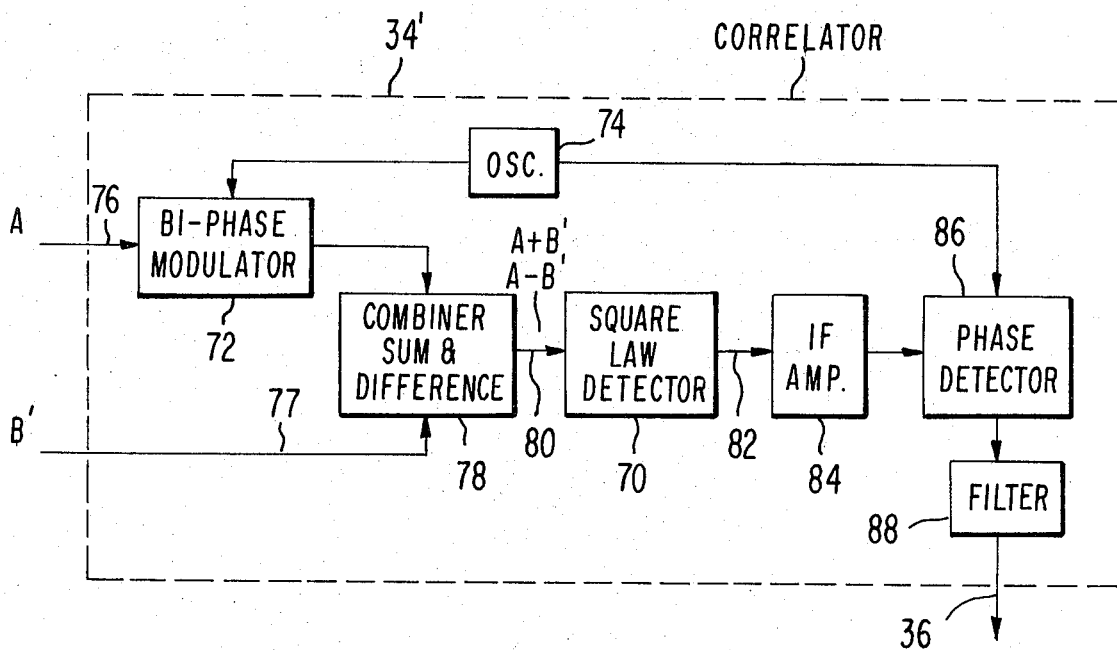

In the alternative arrangement, FIG. 2, a single square law detector 70 is provided in correlator 34' which therefore avoides the matching problem. In particular, this latter arrangement includes a bi-phase modulator 72 driven by an oscillator 74. The modulator 72 receives signal A at an input 76 thereto. The bi-phase modulator 72 changes the phase of the signal A between 0° and 180° for each cycle of the modulator driver frequency. Thus, the phase is 0° for one-half cycle and 180° for the other half of each cycle of the driver frequency.

The bi-phase modulated signal is combined in a magic T device 78 with signal B' on input 77. The magic T output signal appearing at output 80 contains the sum signal (A+B') when the modulator provides 0° phase shift and the difference signal (A−B') when the modulator 72 provides 180° phase shift. The magic T 78 output signal is applied to square law detector 70.

The sum and difference signals are time shared at the frequency of the modulator driver oscillator 74.

The sum and difference signals differ in magnitude resulting in a ripple on the output 82 of the square law detector 70 at the frequency of the modulator driver. This ripple contains only the cross-modulation term. In turn, the ripple is amplified by an amplifier 84 tuned to the modulating frequency. The amplified ripple is then detected in a phase detector 86 and filtered by filter 88 to reduce the noise bandwidth. The modulator driver oscillator 74 also drives the phase detector 86.

It can be shown mathematically that the amplifier 84 receives an approximate square wave signal varying at the modulation frequency with a peak-to-peak amplitude of $$e_{pp} (E_i^2/2) \alpha_s \alpha_x L^2 \tag{10}$$

where $$E_i = E_{RX} = E_{RS}.$$

Thus, the alternate arrangement of FIG. 2 provides a cross-correlation term, equation 10, while using a single receiving channel and providing fully coherent detection.

What is claimed is:

1. In combination:
   first sample-holding means for holding a first sample of matter having a known amount of a given component,
   second sample-holding means for holding a second sample of matter having a plurality of components including an unknown amount of said given component,
   means for applying microwave energy to each said sample-holding means, said energy being absorbed by at least said given component in a spectrum of frequencies, a different absorption spectrum being exhibited by each different component absorbing said energy, each said sample-holding means producing a respective output signal corresponding to said microwave energy altered by said absorption spectrum,
   means responsive to said microwave energy and said output signals applied as respective inputs thereto for producing a first signal manifesting solely the spectrum of microwave energy absorbed by said first sample and a second signal manifesting solely the spectrum of microwave energy absorbed by said second sample, and
   correlating means responsive to said first and second signals applied as inputs thereto for cross-correlating said first and second signals to thereby produce a signal manifesting the amount of said unknown component in said second sample.

2. The combination of claim 1 wherein said first signal producing means includes first phase setting means responsive to said microwave energy applied thereto coupled across said first sample-holding means for setting said applied microwave energy in substantially identical phase as said first sample-holding means output signal, and means for subtracting said first sample-holding means output signal and said set microwave energy from each other to produce said first signal.

3. The combination of claim 2 wherein said second signal producing means includes second phase setting means responsive to said microwave energy applied thereto coupled across said second sample-holding means for setting said applied microwave energy in substantially identical phase with said second sample-holding means output signal, and means for subtracting said second sample-holding means output signal and said set microwave energy across said second sample-holding means from each other to produce said second signal.

4. The combination of claim 3 wherein one of said signal producing means includes phase setting means for setting substantially identical the phase of said microwave energy applied to said first and second signal producing means.

5. In combination:
   means for deriving a first signal comprising solely a spectrum of frequencies of microwave energy which spectrum is formed by absorption of certain said energy by a sample of matter, said sample including a plurality of components including an unknown amount of a given component,
   means for deriving a second signal comprising solely a spectrum of frequencies of microwave energy which spectrum is formed by absorption of certain of said energy by a known amount of said given component, and
   correlating means responsive to said first and second signals applied thereto for cross-correlating said first and second signals to produce as an output signal therefrom a signal manifesting the amount of said given component in said sample of matter.

6. The combination of claim 5 wherein said first signal deriving means includes a first sample-holding cell and first phase adjusting means coupled across said cell, said first sample-holding cell and said first adjusting means including input means for receiving said microwave energy, said first cell and first adjusting means each having an output signal comprising microwave energy having substantially identical phase, and combining means responsive to said cell and adjusting means output signals of taking the difference between said last-mentioned output signals, to thereby derive said first signal.

7. The combination of claim 6 wherein said second signal deriving means includes a second sample-holding cell and second phase adjusting means coupled across said second cell, said second cell and second adjusting means including input means for receiving said microwave energy, said second cell and second adjusting means each having an output signal comprising microwave energy having substantially identical phase, and combining means responsive to said cell and adjusting means output signals for taking the difference between said last-mentioned output signals to thereby derive said second signal.

8. The combination of claim 5 wherein said correlating means includes means responsive to said first and second signals applied as inputs thereto for taking the sum and difference between said first and second signals to provide as output signals therefrom third and fourth signals corresponding to said sum and difference, squaring means for squaring said third and fourth signals applied thereto, and means responsive to said squared third and fourth signals for deriving a fifth signal manifesting the product of said first and second signals.

9. The combination of claim 8 wherein said means for taking the sum and difference includes means for modulating one of said first and second signals.

10. The combination of claim 5 wherein said first and second signal deriving means each includes a separate, different sample-holding means coupled in parallel with corresponding phase adjusting means, and said deriving means further includes means for applying microwave energy to said sample-holding means and said phase adjusting means.

11. The combination of claim 10 wherein said applying means includes a resistance serially coupled to one of said first and second deriving means and phase adjusting means serially coupled to the others of said first and second deriving means, said last-mentioned resistance and phase adjusting means adjusting both the amplitude and phase of said microwave energy applied to each said sample-holding means substantially identical.

12. The combination of claim 10 wherein said first and second signal deriving means each include a separate, different variable resistance serially coupled with a separate different sample-holding means across the phase adjusting means corresponding to that sample-holding means.

* * * * *

UNITED STATES PATENT OFFICE
CERTIFICATE OF CORRECTION

Patent No. 3,866,118                              Dated February 11, 1975

Inventor(s) Asoke Kumar Ghosh and Harry John Moody

It is certified that error appears in the above-identified patent and that said Letters Patent are hereby corrected as shown below:

Col.5, line 42

$$"E_S = E_{RS} e^{\alpha_S L} \simeq E_{RS}(1-\alpha_S L) \qquad (2)"$$

should read $$-- E_S = E_{RS} e^{\alpha_S L} \simeq E_{RS}(1-\alpha_S L) \qquad (2) --$$

Col. 6, lines 1-3

$$"E_\Delta^2 = 1/8 \ (1+\cos 2\omega t) \ (E_{RX}^2 \alpha_X^2 L^2 + E_{RS}^2 \alpha_S^2 L^2 - 2E_{RS}E_{RX}\alpha_S \alpha_X L^2) \qquad (7)"$$

should read $$-- E_\Delta^2 = 1/8 \ (1+\cos 2\omega t) \ (E_{RX}^2 \alpha_X^2 L^2 + E_{RS}^2 \alpha_S^2 L^2 - 2E_{RS}E_{RX}\alpha_S \alpha_X L^2) \qquad (7) --$$

Col. 6, lines 6 & 7

$$"E_\Sigma^2 = 1/8 \ (1+\cos 2 i \omega t) \ (E_{RX}^2 \alpha_X^2 L^2 + E_{RS}^2 \alpha_S^2 L^2 + 2E_{RS}E_{RX}\alpha_S \alpha_X L^2) \qquad (8)"$$

should read $$-- E_\Sigma^2 = 1/8 \ (1+\cos 2\omega t) \ (E_{RX}^2 \alpha_X^2 L^2 + E_{RS}^2 \alpha_S^2 L^2 + 2E_{RS}E_{RX}\alpha_S \alpha_X L^2) \qquad (8) --$$

Col. 8, line 41, after "signals" "of" should read -- for --.

Signed and sealed this 27th day of May 1975.

(SEAL)
Attest:

RUTH C. MASON
Attesting Officer

C. MARSHALL DANN
Commissioner of Patents
and Trademarks